United States Patent
Baeck et al.

(10) Patent No.: US 10,930,966 B2
(45) Date of Patent: Feb. 23, 2021

(54) FUEL CELL WITH ELASTIC MEMBER

(71) Applicants: Hyundai Motor Company, Seoul (KR); Kia Motors Corporation, Seoul (KR)

(72) Inventors: Suk Min Baeck, Gyeonggi-do (KR); Yong Suk Heo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 126 days.

(21) Appl. No.: 16/213,320

(22) Filed: Dec. 7, 2018

(65) Prior Publication Data

US 2020/0058951 A1 Feb. 20, 2020

(30) Foreign Application Priority Data

Aug. 20, 2018 (KR) .................. 10-2018-0096690

(51) Int. Cl.
*H01M 8/2475* (2016.01)
*H01M 8/248* (2016.01)
*H01M 8/247* (2016.01)

(52) U.S. Cl.
CPC ......... *H01M 8/2475* (2013.01); *H01M 8/247* (2013.01); *H01M 8/248* (2013.01)

(58) Field of Classification Search
CPC ..... H01M 8/247; H01M 8/248; H01M 8/2475
See application file for complete search history.

(56) References Cited

U.S. PATENT DOCUMENTS

| 2003/0232233 A1* | 12/2003 | Andrews | H01M 8/241 429/460 |
| 2011/0281195 A1* | 11/2011 | Fuller | H01M 8/0297 429/467 |
| 2017/0294673 A1* | 10/2017 | Morikawa | H01M 8/126 |

FOREIGN PATENT DOCUMENTS

JP 2006-172856 A 6/2006
KR 10-2017-0043626 A 4/2017

* cited by examiner

*Primary Examiner* — Jeremiah R Smith
(74) *Attorney, Agent, or Firm* — Mintz Levin Cohn Ferris Glovsky and Popeo, P.C.; Peter F. Corless (57) ABSTRACT

A fuel cell having an elastic member is provided. The fuel cell includes a cell stack in which a plurality of unit cells are stacked in a first direction and an end-plate disposed on each of opposite side ends of the cell stack. The elastic member is disposed in a portion of the end-plate to overlap a lower area of the cell stack in which condensate water remains in the first direction.

19 Claims, 9 Drawing Sheets

FUEL CELL WITH ELASTIC MEMBER

CROSS REFERENCE TO RELATED APPLICATION(S)

This application claims the benefit of Korean Patent Application No. 10-2018-0096690, filed on Aug. 20, 2018 which is hereby incorporated by reference as if fully set forth herein.

BACKGROUND

Field of the Disclosure

The present disclosure relates to a fuel cell, and more particularly, to a fuel cell that prevents damage to a gas diffusion layer and a separation plate by using an elastic member.

Discussion of the Related Art

In general, as the byproduct of power generation using hydrogen and oxygen in a fuel cell, water (hereinafter referred to as generated water or condensate water) may be generated and remain in each of a plurality of unit cells. Particularly, a vehicle including a fuel cell may be exposed to various external environmental factors. When the vehicle is exposed to a low temperature for a long period of time, the generated water remaining in each unit cell may freeze, and the expansion of the frozen generated water may increase contact pressure in a specific area inside the unit cells. Accordingly, irreversible plastic deformation may occur in a gas diffusion layer and a separation plate among constituent elements inside the unit cells, which may deteriorate the performance and durability of a cell stack composed of the unit cells.

SUMMARY

Accordingly, exemplary embodiments are directed to a fuel cell that substantially obviates one or more problems due to limitations and disadvantages of the related art. Exemplary embodiments provide a fuel cell having excellent performance and durability. Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

According to one exemplary embodiment, a fuel cell may include a cell stack in which a plurality of unit cells are stacked in a first direction, an end-plate disposed on each of opposite side ends of the cell stack, and an elastic member overlapped with a lower area of the cell stack in which condensate water remains in the first direction, at least a portion of the elastic member being disposed within the end-plate.

For example, the end-plate may include a body formed with a recess and a collector plate disposed between the cell stack and an inner lateral surface of the body that faces the cell stack, and the elastic member may be spaced apart from the collector plate and may be disposed in the recess. The body may include a first area, the recess in which the elastic member is disposed being positioned in the first area and a second area in which the elastic member is not disposed, the second area being located above the first area.

Additionally, the first area may have a first length that is equal to or less than a second length of the second area in a gravitational direction. The first length may correspond to a length from a bottom surface of the collector plate to a first point that is one third of an overall height of the collector body, and the second length may correspond to a length from the first point to a top surface of the body.

Further, the elastic member may include a plurality of springs stacked in a gravitational direction and spaced apart from each other. The respective springs may have elastic force to cause the first area and the second area have the same initial pressure in an initial state in which the condensate water does not expand. The respective springs may be reduced in elastic force with increasing distance from a bottom surface of the body. All of the springs may have the same elastic force per unit length, and the respective springs may be reduced in length with increasing distance from a bottom surface of the body.

The elastic member may have the same repulsive force as a pressure applied to the inner lateral surface of the body by expansion force of the condensate water. In particular, the repulsive force of the elastic member may range from about 0.8 Mpa to 1.2 Mpa. Additionally, the elastic member may have an elastic modulus that causes the repulsive force to be less than about 1.5 Mpa when a displacement of the inner lateral surface by the expansion force is about 1 mm.

Each of the unit cells may include a membrane electrode assembly having a fuel electrode, an air electrode, and a polymer electrolyte membrane disposed between the fuel electrode and the air electrode, a gas diffusion layer disposed on either side of the membrane electrode assembly, and a separation plate disposed at an outer side of the gas diffusion layers. Each of the end-plate and the separation plate may include an inlet communication portion into which reactant gas is introduced and an outlet communication portion from which the reactant gas and the condensate water are discharged, the outlet communication portion being located lower than the outlet communication portion, the inlet communication portions of the end-plate and the separation plate may communicate with each other, and the outlet communication portions of the end-plate and the separation plate may communicate with each other.

The fuel cell may further include a stopper disposed between the collector plate and the elastic member. Each of the unit cells may further include a gasket disposed between the separation plate and the gas diffusion layer, and the stopper may be disposed to overlap the gasket in the first direction. Additionally, a first length of the first area in a gravitational direction may correspond to a length from a bottom surface of the separation plate to a first point that is one third of an overall height of the separation plate, and a second length of the second area in the gravitational direction may correspond to a length from the first point to a top surface of the separation plate.

The elastic member may include a first elastic member disposed inside the end-plate that is disposed on a first side end among the opposite side ends of the cell stack, and a second elastic member disposed inside the end-plate disposed on a second side end among the opposite side ends of the cell stack. An elastic force of the first elastic member may be different from an elastic force of the second elastic member.

A reactant gas may be introduced or discharged via the first side among the opposite side ends of side ends of the cell stack, and the elastic force of the first elastic member may be greater than the elastic forced of the second elastic member. The first elastic member and the second elastic member may have a symmetrical cross-sectional shape in the first direction with respect to the center of the cell stack.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments will be described in detail with reference to the accompanying drawings, in order to concretely describe the disclosure and to assist in understanding of the disclosure. However, the exemplary embodiments disclosed here may be altered into various other forms, and the scope of the disclosure should not be construed as being limited to the exemplary embodiments. The exemplary embodiments disclosed here are provided to more completely describe the disclosure to those of ordinary skill in the art.

It will be understood that, when an element is referred to as being formed "on" or "under" another element, it can be directly "on" or "under" the other element or be indirectly formed with intervening elements therebetween. In addition, when expressed as "upper (above)" or "lower (under)", this may include the meaning not only of the upward direction but also of the downward direction on the basis of a given element.

In addition, relative terms such as, for example, "first", "second", "on/upper/above" and "beneath/lower/below", used in the following description may be used to distinguish any one substance or element with another substance or element without requiring or containing any physical or logical relationship or sequence between these substances or elements.

Hereinafter, a fuel cell 100 or 100A according to the exemplary embodiments will be described with reference to the accompanying drawings. For convenience of description, the fuel cell 100 or 100A will be described using the Cartesian coordinate system (x, y, z), but may be described using any other coordinate system. In addition, in the Cartesian coordinate system, the x-axis, the y-axis, and the z-axis are orthogonal to each other, but the embodiments are not limited thereto. In other words, the x-axis, the y-axis, and the z-axis may cross each other obliquely.

Figure 1:
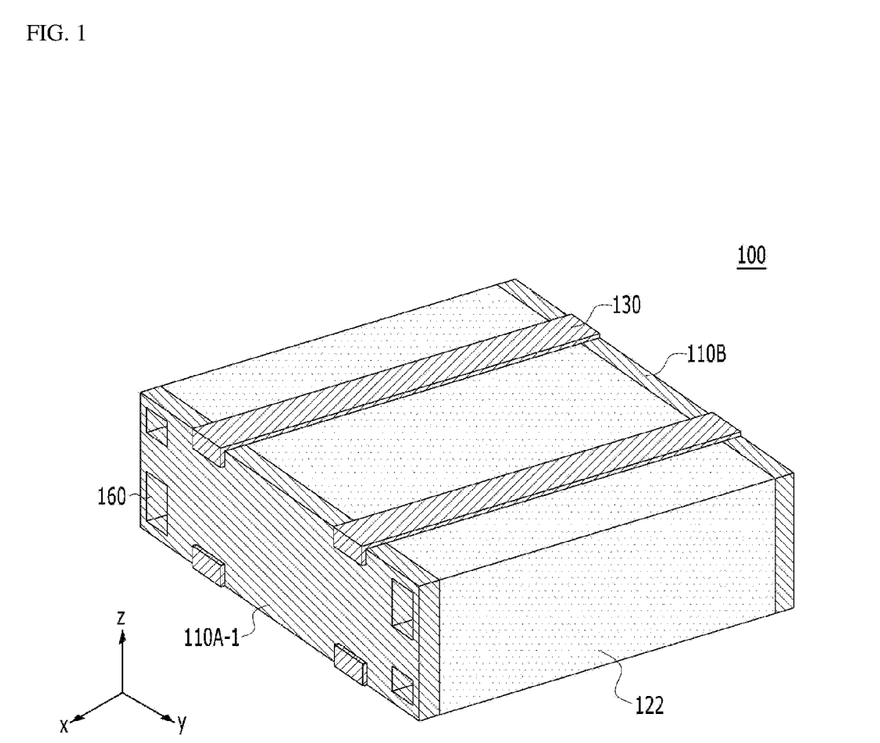
FIG. 1 is a perspective view illustrating the external appearance of a fuel cell according to an exemplary embodiment of the present disclosure.

FIG. 1 is a perspective view illustrating the external appearance of a fuel cell 100 according to an exemplary embodiment. The fuel cell 100 may be a polymer electrolyte membrane fuel cell (or proton exchange membrane fuel cell) (PEMFC), which is commonly studied as a power supply for vehicle driving, but the exemplary embodiments are not limited to a specific form of the fuel cell 100.

The fuel cell 100 may include end-plates (or pressure plates or compression plates) 110A-1 and 110B and a cell stack 122. The cell stack 122 may include a plurality of unit cells stacked in a first direction (e.g. the x-axis direction). The end-plates 110A-1 and 110B may be disposed respectively on opposite side ends of the cell stack 122 and may support and fix the unit cells. In other words, the first end-plate 110A-1 may be disposed on a first side end among opposite side ends of the cell stack 122, and the second end-plate 110B may be disposed on a second side end among opposite side ends of the cell stack 122.

In addition, the fuel cell 100 may further include a fastening member 130. The fastening member 130 may fasten the end-plates 110A-1 and 110B and the unit cells together in the first direction (e.g. the x-axis direction). For example, as illustrated in FIG. 1, the fastening member 130 may be formed as a bar, but the exemplary embodiments are not limited thereto. In other words, according to another exemplary embodiment, the fastening member 130 may be formed as an elongated bolt, a belt, or a rigid rope to fasten the unit cells.

Now, an example of coupling the fastening member 130 to the fuel cell 100 will be described. After the end-plates 110A-1 and 110B are disposed respectively on opposite side ends of the cell stack 122 in which the unit cells are repeatedly stacked, this structure may be loaded into fastening equipment. Then, when an appropriate load is applied thereto, the cell stack 122 may be fastened to the end-plates 110A-1 and 110B using the fastening member 130. Accordingly, the fastening pressure of the cell stack 122 may be maintained by the end-plates 110A-1 and 110B which are rigid.

Figure 2:
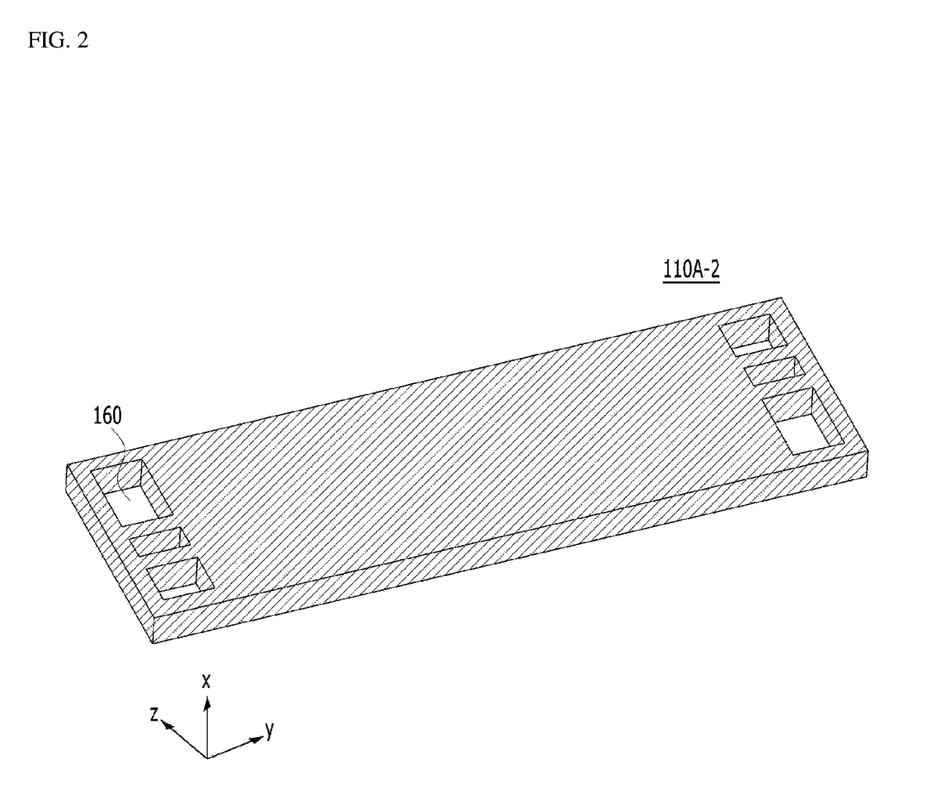
FIG. 2 is a perspective illustrating another exemplary embodiment of a first end-plate illustrated in FIG. 1 according to an exemplary embodiment of the present disclosure.

FIG. 2 is a perspective illustrating another exemplary embodiment 110A-2 of the first end-plate 110A-1 illustrated in FIG. 1. The first end-plate 110A-1 illustrated in FIG. 1 may include a plurality of inlets and outlets 160. As illustrated in FIG. 1, the first end-plate 110A-1 may include four inlets and outlets 160, and as illustrated in FIG. 2, the first end-plate 110A-2 may include six inlets and outlets 160, but the exemplary embodiments are not limited thereto.

In addition, the first end-plate 110A-1 illustrated in FIG. 1 may be replaced with the first end-plate 110A-2 illustrated in FIG. 2. In other words, the exemplary embodiments are not limited to specific forms of the first end-plate 110A-1 or 110A-2 and the second end-plate 110B. The inlets and outlets 160 will be described below in more detail.

Figure 3:
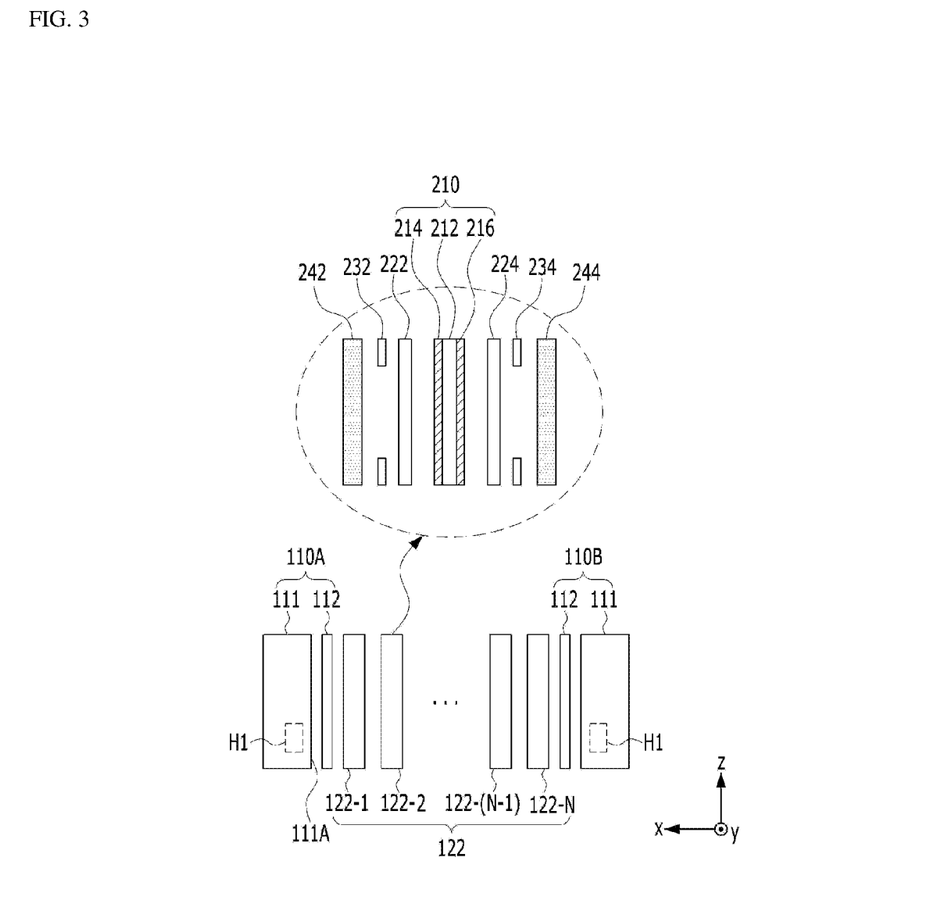
FIG. 3 is a cross-sectional view illustrating end-plates and a cell stack of the fuel cell according to an exemplary embodiment of the present disclosure.

FIG. 3 is a cross-sectional view illustrating end-plates 110A and 110B and the cell stack 122 of the fuel cell 100. For convenience of description, the fastening member 130 illustrated in FIG. 1 is omitted in FIG. 3. The end-plate 110A illustrated in FIG. 3 may correspond to the end-plate 110A-1 or 110-2 illustrated in FIG. 1 or 2, and the cell stack 122 illustrated in FIG. 3 may correspond to the exemplary embodiment of the cell stack 122 illustrated in FIG. 1. The same parts will be designated by the same reference numerals, and a repeated description related to the same parts will be omitted.

Referring to FIG. 3, the cell stack 122 may include a plurality of units cells 122-1 to 122-N stacked in the first direction (e.g. the x-axis direction). Particularly, "N" is a positive integer equal to or greater than 1, and may be within a range from tens to hundreds. For example, "N" may be within a range from about 100 to 300, and more particularly, 220, but the exemplary embodiments are not limited to a specific numerical value of "N". Each unit cell 122-$n$ may generate electricity within a range from about 0.6 V to 1.0 V, and about 0.7 V on average. Notably, 1≤n≤N. Thus, "N" may be determined according to the intensity of power to be supplied from the fuel cell 100 to a load. The term "load" may refer to a part of a vehicle that requires power. Each unit cell 122-$n$ may include a membrane electrode assembly (MEA) 210, gas diffusion layers (GDL) 222 and 224, gaskets 232 and 234, and separation plates (or bipolar plates or separators) 242 and 244.

The membrane electrode assembly 210 may include catalytic electrode layers in which an electrochemical reaction occurs and the catalytic electrode layers may be attached to opposite sides of an electrolyte membrane, which allows movement of hydrogen ions, interposed therebetween. Particularly, the membrane electrode assembly 210 may include a polymer electrolyte membrane (or proton exchange membrane) 212, a fuel electrode (or a hydrogen electrode or an anode) 214, and an air electrode (or an oxygen electrode or a cathode) 216.

The polymer electrolyte membrane 212 may be disposed between the fuel electrode 214 and the air electrode 216. In the fuel cell 100, hydrogen as a fuel may be supplied to the fuel electrode 214 through the first separation plate 242, and air containing oxygen as an oxidizer may be supplied to the air electrode 216 through the second separation plate 244.

The hydrogen supplied to the fuel electrode 214 may be decomposed into hydrogen ions (H+) (protons) and electrons (e−) by a catalyst. Among these, only the hydrogen ions may selectively pass through the polymer electrolyte membrane 212 and be transferred to the air electrode 216, and the electrons may be transferred to the air electrode 216 through the separation plates 242 and 244, which are conductors. For the operation described above, catalytic layers may be applied to each of the fuel electrode 214 and the air electrode 216. Accordingly, current may be generated by the flow of electrons that occurs via an external conducting line due to the movement of electrons. In other words, the fuel cell 100 may be configured to generate power by an electrochemical reaction between hydrogen as a fuel and oxygen contained in the air.

The air electrode 216 provokes a reaction in which the hydrogen ions supplied through the polymer electrolyte membrane 212 and the electrons transferred through the separation plates 242 and 244 meet oxygen in the air supplied to the air electrode 216 to generate water (hereinafter referred to as "condensate water" or "generated water"). Accordingly, the condensate water generated in the air electrode 216 may penetrate the polymer electrolyte membrane 212 and be transferred to the fuel electrode 214. In some cases, the fuel electrode 214 may be referred to as an anode and the air electrode 216 may be referred to as a cathode, or conversely, the fuel electrode 214 may be referred to as a cathode and the air electrode 216 may be referred to as an anode.

The gas diffusion layers 222 and 224 may evenly distribute hydrogen and oxygen which are reactant gases and may transfer generated electricity. Accordingly, the gas diffusion layers 222 and 224 may be disposed respectively on opposite sides of the membrane electrode assembly 210. In other words, the first gas diffusion layer 222 may be disposed at the left side of the fuel electrode 214 and the second gas diffusion layer 224 may be disposed at the right side of the air electrode 216.

The first gas diffusion layer 222 may diffuse and evenly distribute hydrogen, which is reactant gas supplied through the first separation plate 242, and may be electrically conductive. The second gas diffusion layer 224 may diffuse and evenly distribute the air, which is reactant gas supplied through the second separation plate 244, and may be electrically conductive. Each of the first and second gas diffusion layers 222 and 224 may be a micropore layer obtained by coupling micro carbon fibers, but the exemplary embodiments are not limited to a specific form of the first and second gas diffusion layers 222 and 224.

The gaskets 232 and 234 may maintain airtightness/watertightness of reactant gases and cooling water and appropriate fastening pressure, to disperse stress when the separation plates 242 and 244 are stacked, and to independently seal flow-paths. Through the maintenance of airtightness/watertightness by the gaskets 232 and 234, the flatness of a surface adjacent to the cell stack 122 in which power is generated may be managed, and thus, even contact-pressure distribution may be realized on the reaction surface of the cell stack 122.

The separation plates 242 and 244 may move reactant gases and a cooling medium, and also may separate the respective unit cells from each other. In addition, the separation plates 242 and 244 may structurally support the membrane electrode assembly 210 and the gas diffusion layers 222 and 224. The separation plates 242 and 244 may also collect generated current and transfer the current to collector plates 112. Particularly, the separation plates 242 and 244 may be disposed at the outer side of the respective gas diffusion layers 222 and 224. In other words, the first separation plate 242 may be disposed at the left side of the first gas diffusion layer 222 and the second separation plate 244 may be disposed at the right side of the second gas diffusion layer 224.

The first separation plate 242 may supply hydrogen as reactant gas to the fuel electrode 214 through the first gas diffusion layer 222. Accordingly, the first separation plate 242 may include an anode plate (AP) formed with a channel (i.e. a passage or a flow-path) through which the hydrogen may flow. The second separation plate 244 may supply the air as reactant gas to the air electrode 216 through the second gas diffusion layer 224. Accordingly, the second separation plate 244 may include a cathode plate (CP) formed with a channel through which the air may flow.

In addition, each of the first and second separation plates 242 and 244 may form a channel through which a cooling medium (e.g. cooling water) may flow. The separation plates 242 and 244 may be formed of a graphite-based, complex-graphite-based, or metal-based material, but the exemplary embodiments are not limited to a specific material of the separation plates 242 and 244. When the first end-plate 100A illustrated in FIG. 3 is implemented as illustrated in FIG. 1 or 2, each of the first and second separation plates 242 and 244 may include inlets and outlets, formed at the same positions as and in the same forms as the respective inlets and outlets 160 illustrated in FIG. 1 or 2.

Hydrogen and oxygen, which are reactant gases required in the membrane electrode assembly 210, may be introduced into the cell stack 122 through the inlets. Gas or liquid, to which the supplied humid reactant gases and condensate water generated in the cell are added, may be discharged to the outside of the fuel cell 100 through the outlets. The condensate water may be discharged from the lower portion of the unit cells 122-1 to 122-N, or may remain in the lower portion under the influence of gravity. In addition, a cooling medium may be introduced from the outside into the cell stack 122 through the inlets, and then may be discharged to the outside through the outlets.

Each of the first and second end-plates 110A and 110B may include a body 111 and the collector plate 112. The body 111 may be formed in a manner such that a metal insert is surrounded by a plastic injection-molded article. The metal insert of the body 111 may be highly rigid to overcome the internal contact pressure of the metal insert and may be realized by machine-processing a metal material. For example, the body 111 may be formed by coupling a plurality of plates, but the exemplary embodiments are not limited to a specific configuration of the body 111. The collector plate 112 may be disposed between the cell stack 122 and an inner lateral surface 111A of the body 111 which faces the cell stack 122. The collector plate 112 may collect electricity generated by the flow of electrons in the cell stack 122 and supply the electricity to a vehicle load in which the fuel cell 100 is used.

As described above, as the byproduct of power generation using oxygen and hydrogen in the fuel cell 100, condensate water may remain in each of the unit cells 122-1 to 122-N. In particular, when the vehicle including the fuel cell 100 is exposed to a low temperature for a long period of time, the condensate water remaining in each unit cell 122-$n$ of the cell stack 122 may freeze, and the expansion of the frozen condensate water may increase contact pressure in a specific area inside the unit cells 122-1 to 122-N. Thus, irreversible plastic deformation may occur in the gas diffusion layers 222 and 224 and separation plates 242 and 244 of the unit cell 122-$n$, which may deteriorate the performance and durability of the cell stack 122. Therefore, to offset such a local increase in contact pressure, the fuel cell 100 according to the exemplary embodiment may include an elastic member.

Hereinafter, the configuration and operation of an exemplary embodiment 100A of the fuel cell 100 including an elastic member according to an exemplary embodiment will be described with reference to the accompanying drawings.

Figure 4:
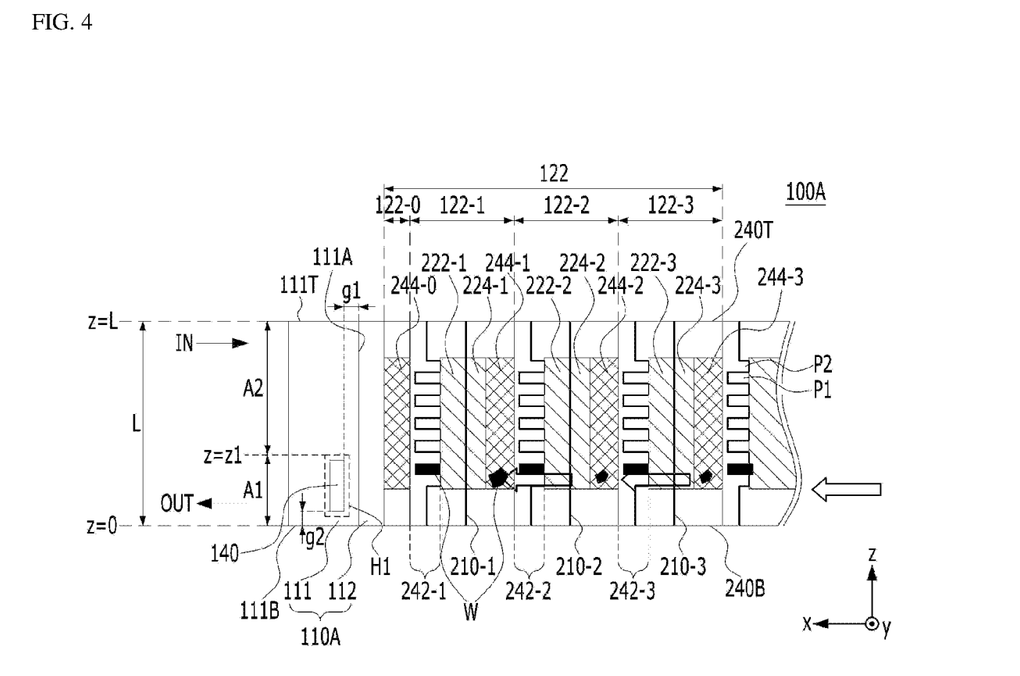
FIG. 4 is a partial cross-sectional view illustrating an exemplary embodiment of the fuel cell illustrated in FIGS. 1 and 3 according to an exemplary embodiment of the present disclosure.

FIG. 4 is a partial cross-sectional view illustrating an exemplary embodiment 100A of the fuel cell 100 illustrated in FIGS. 1 and 3. Particularly, "IN" may represent a direction in which reaction gas or cooling medium is introduced through the inlet 160 illustrated in FIG. 1 or 2 and "OUT" may represent a direction in which reaction gas or cooling medium is discharged through the outlet 160 illustrated in FIG. 1 or 2.

For convenience of description, the fastening member 130 illustrated in FIG. 1 is omitted in the fuel cell 100A illustrated in FIG. 4. In FIG. 4, only the first end-plate 110A and first to third unit cells 122-1 to 122-3 located proximate the first end-plate 110A are illustrated. However, the second end-plate 110B and $N^{th}$ to N-$2^{nd}$ unit cells 122-N, 122-(N−1) and 122-(N−2) located proximate to the second end-plate 110B may have the same cross-sectional shape as the first end-plate 110A and the first to third unit cells 122-1 to 122-3 illustrated in FIG. 4.

For example, in FIG. 4, the cell stack 122 may have a symmetrical cross-sectional shape in the first direction (e.g. the x-axis direction) about an N/$2^{nd}$ unit cell (122-(N/2)). In addition, an elastic member disposed in the first end-plate 110A (hereinafter referred to as a "first elastic member") 140 and an elastic member disposed in the second end-plate 110B (hereinafter referred to as a "second elastic member") (not shown) may have a symmetrical cross-sectional shape in the first direction (e.g. the x-axis direction) about the center of the cell stack 122.

However, the exemplary embodiments are not limited thereto. According to another exemplary embodiment, in FIG. 4, the cell stack 122 may have an asymmetrical cross-sectional shape in the first direction (e.g. the x-axis direction) about the N/$2^{nd}$ unit cell (122-(N/2)). In addition, the first elastic member and the second elastic member may have an asymmetrical cross-sectional shape in the first direction (e.g. the x-axis direction) about the center of the cell stack 122.

The fuel cell 100A illustrated in FIG. 4 may include the first end-plate 100A, the first to third unit cells 122-1, 122-2 and 122-3, and the elastic member 140. The first end-plate 110A and the first to third unit cells 122-1, 122-2 and 122-3 respectively correspond to and perform the same function as the first end-plate 110A and the first to third unit cells 122-1, 122-2 and 122-3, and thus are designated by the same reference numerals, and a repeated description thereto will be omitted.

In FIG. 4, the first separation plate 242 may include a reaction channel (or a reaction flow-path). In other words, the first separation plate 242 (242-1, 242-2 and 242-3) may include a channel P1 through which hydrogen as reactant gas may flow. A cooling medium may flow through a groove P2 which is opposite the channel P1.

Furthermore, the second separation plate 244 may be a microporous structure (e.g. 244-1, 244-2. 244-3), but the exemplary embodiments are not limited thereto. In other words, instead of being formed as the microporous structure, the second separation plate 244 may have a reaction channel, similarly to the first separation plate 242. Alternatively, instead of including the reaction channel, the first separation plate 242 may be formed as a microporous structure.

Referring to FIG. 4, the microporous structure may evenly compress the second gas diffusion layer 224 (e.g. 224-1, 224-2, 224-3) to evenly distribute contact pressure and may improve local diffusion of reactant gas and the discharge of generated water through micropores. A microporous structure such as a metal foam or a wire mesh may have a high aperture ratio and may also have a contact pressure distribution function of evenly compressing the second gas diffusion layer 224. The metal foam has a configuration in which numerous air bubbles are connected to each other in a metal material, and provides a fluid passage and has high rigidity and a high surface area ratio per unit volume, and thus may be suitable as a separation plate material. For example, the microporous structure may be formed of any one material selected from among silver, copper, gold, aluminum, tungsten, zinc, and metal alloys, which have excellent electrical conductivity.

In addition, the fuel cell 100A may further include a dummy cell 122-0. Particularly, the dummy cell 122-0 is a cell stacked for water discharge without the implementation of a chemical reaction. As illustrated in FIG. 4, the dummy cell 122-0 may be disposed between the first end-plate 110A and the first unit cell 122-1. The dummy cell 122-0 may include at least one of a cathode plate CP, an anode plate AP, an end anode plate (EAP), or an end cathode plate (ECP). For example, the dummy cell 122-0 may include a plate 244-0, and the plate 244-0 may be a CP or an ECP. Particularly, the EAP refers to a plate obtained by removing hydrogen inlets and outlets from a general AP, and the ECP refers to a plate obtained by removing air inlets and outlets from a general CP.

For example, in FIG. 4, the dummy cell 122-0 is illustrated as including the microporous structure 244-0, but the exemplary embodiments are not limited thereto. In some cases, the dummy cell 122-0 may be omitted. Meanwhile, referring to FIGS. 3 and 4, the elastic member 140 may be disposed to overlap in the first direction (e.g. the x-axis direction) the lower area of the cell stack 122 in which condensate water W may remain. The elastic member 140 may be disposed in a portion of at least one of the first or second end-plate 110A or 110B.

For example, the elastic member 140 may be disposed in a first recess H1, which is formed in the body 111 of each of the first and second end-plates 110A and 110B, as illustrated in FIG. 3. The inside of the first recess H1 in which the elastic member 140 is disposed may be filled with air, may be a vacuum, or may be filled with an insulation material, for example, a plastic.

The body 111 of at least one of the first or second end-plate 110A or 110B may include first and second areas A1 and A2. In particular, the first area A1 is an area of the body 111 in which the elastic member 140 is disposed, and may be located in the lower portion of the body 111 in the gravitational direction (e.g., the z-axis direction). The second area A2 may be located in the upper portion of the body 111, i.e. above the first area A1 in the gravitational direction, and no elastic member 140 may be disposed in the second area A2. As illustrated in FIG. 4, the first area A1 may be an area from the bottom surface 111B of the body 111 to the top surface of the first recess H1, and unlike the illustration of FIG. 4, the first area A1 may be area from the bottom surface 111B of the body 111 to the top surface of the elastic member 140.

A first length of the first area A1 in the gravitational direction (e.g. the z-axis direction) may be less than a second length of the second area A2. Particularly, the first length may correspond to a length from the bottom surface 240B of the separation plate 242 or 244 to a first point z1, which is one third of the overall height L of the separation plate 242 or 244. The second length may correspond to a length from the first point z1 to the top surface 240T of the separation plate 242 or 244.

Alternatively, the first length may correspond to a length from the bottom surface 111B of the body 111 of the first end-plate 110A to the first point z1, which is one third of the overall height L of the body 111 of the end-plate 110A. The second length may correspond to a length from the first point z1 to the top surface 111T of the body 111. In other words, referring to FIG. 4, the first area A1 may be an area from z=0 to z=z1, and the second area A2 may be an area from z=z1 to z=L.

As illustrated in FIG. 4, the condensate water W, generated by the reaction of reactant gases, may remain in the lower area of the first to third unit cells 122-1 to 122-3. Although not illustrated in FIG. 4, the condensate water W may also remain in the lower area of the fourth to $N^{th}$ unit cells 122-4 to 122-N. The elastic member 140 (or the first recess H1) may be spaced apart from the collector plate 112 by a first distance g1. In addition, the elastic member 140 (or the first recess H1) may be spaced apart from the bottom surface 111B of the body 111 by a second distance g2. The elastic member 140 may be spaced apart from the periphery 111A or 111B since the elastic member 140 may protrude from the body 111 when there is no first or second gap g1 or g2 (i.e. g1=0 or g2=0). When there is no first gap g1 (i.e. g1=0), the elastic member 140 may protrude from the body 111, thus causing damage to the unit cell 122-n of the cell stack 122.

As described above, the reason why the elastic member 140 is disposed to overlap in the first direction (e.g. the x-axis direction) the lower area of the cell stack 122 in which the condensate water W may remain is to cause the elastic member 140 to absorb and offset the expansion force of the condensate water W from the cell stack 122 toward the first end-plate 110A when the condensate water W freezes due to the low temperature around the fuel cell 100 or 100A, as illustrated in FIG. 4. When the expansion force is offset by the elastic member 140, the contact pressure of the reaction surface may be maintained at a constant value, rather than being locally increased due to the expansion of the condensate water W which remains in the lower area of the cell stack 122, and damage to the separation plates 242 and 244 and the gas diffusion layers 222 and 224 may be prevented.

To offset the expansion force, the elastic member 140 may have the following various characteristics. First, the elastic member 140 may have the same repulsive force as the pressure applied to the inner lateral surface 111A of the body 111 by the expansion of the condensate water W, which remains in the cell stack 122. For example, the repulsive force of the elastic member 140 may range from about 0.8 Mpa to 1.2 Mpa, but the exemplary embodiments are not limited thereto.

In addition, the elastic modulus of the elastic member 140 may be determined so that the repulsive force is less than about 1.5 Mpa when the displacement of the inner lateral surface 111A by the expansion force is about 1 mm The elastic force of the elastic member 140 disposed on the first end-plate 110A may be greater than the elastic force of the elastic member 140 disposed on the second end-plate 110B. This reason is as follows.

As will be described below with reference to FIG. 8, the amount of condensate water that may remain in the first unit cell 122-1 is greater than the amount of condensate water that may remain in the $N^{th}$ unit cell 122-N. The greater the amount of condensate water, the greater the expansion force due to freezing. Hence, first expansion force, which is applied to the first end-plate 110A from the unit cell disposed proximate to the first end-plate 110A, is greater than second expansion force, which is applied to the second end-plate 110B from the unit cell disposed proximate to the second end-plate 110B. Thus, to offset the first expansion force greater than the second expansion force, the elastic force of the elastic member 140 disposed in the first end-plate 110A needs to be greater than the elastic force of the elastic member 140 disposed in the second end-plate 110B.

Figure 5:
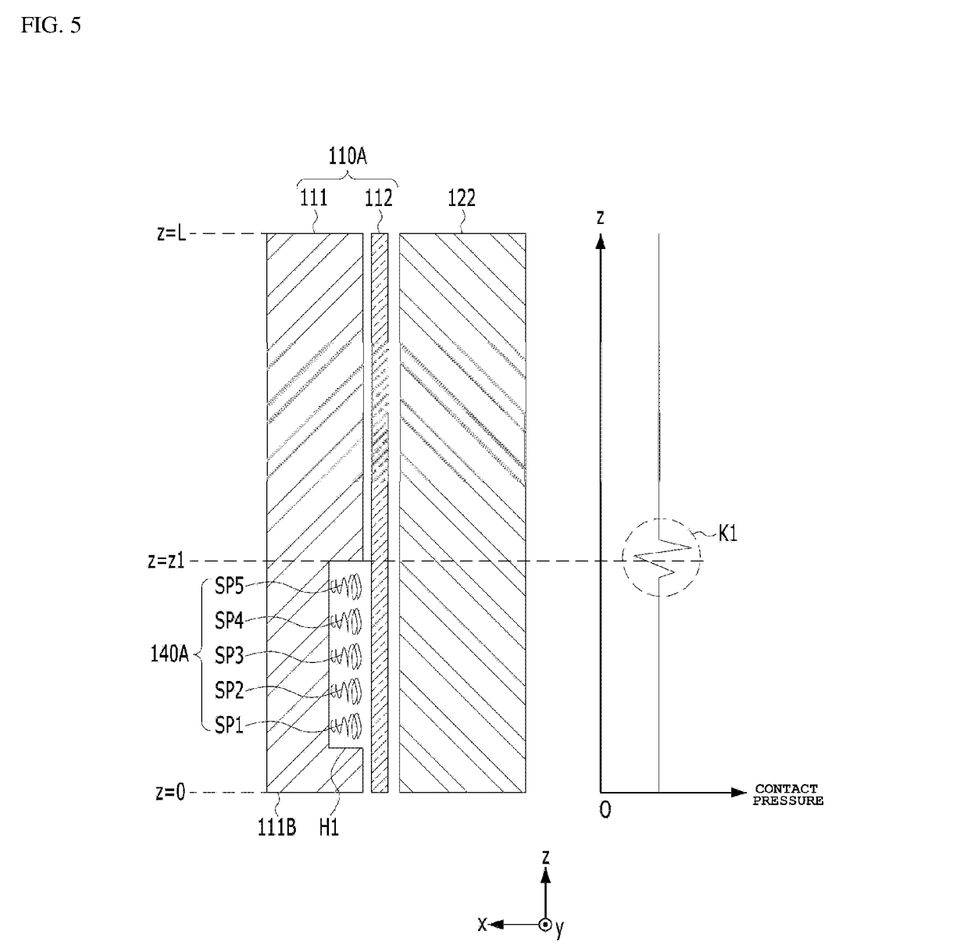
FIG. 5 is a cross-sectional view illustrating one exemplary embodiment of an elastic member illustrated in FIG. 4 according to an exemplary embodiment of the present disclosure.

Hereinafter, various exemplary embodiments of the elastic member 140 will be described with reference to FIGS. 5 to 7. FIG. 5 is a cross-sectional view illustrating one exemplary embodiment 140A of the elastic member 140 illustrated in FIG. 4, FIG. 6 is a cross-sectional view illustrating another exemplary embodiment 140B of the elastic member 140 illustrated in FIG. 4, and FIG. 7 is a cross-sectional view illustrating a further exemplary embodiment 140C of the elastic member 140 illustrated in FIG. 4.

Figure 6:
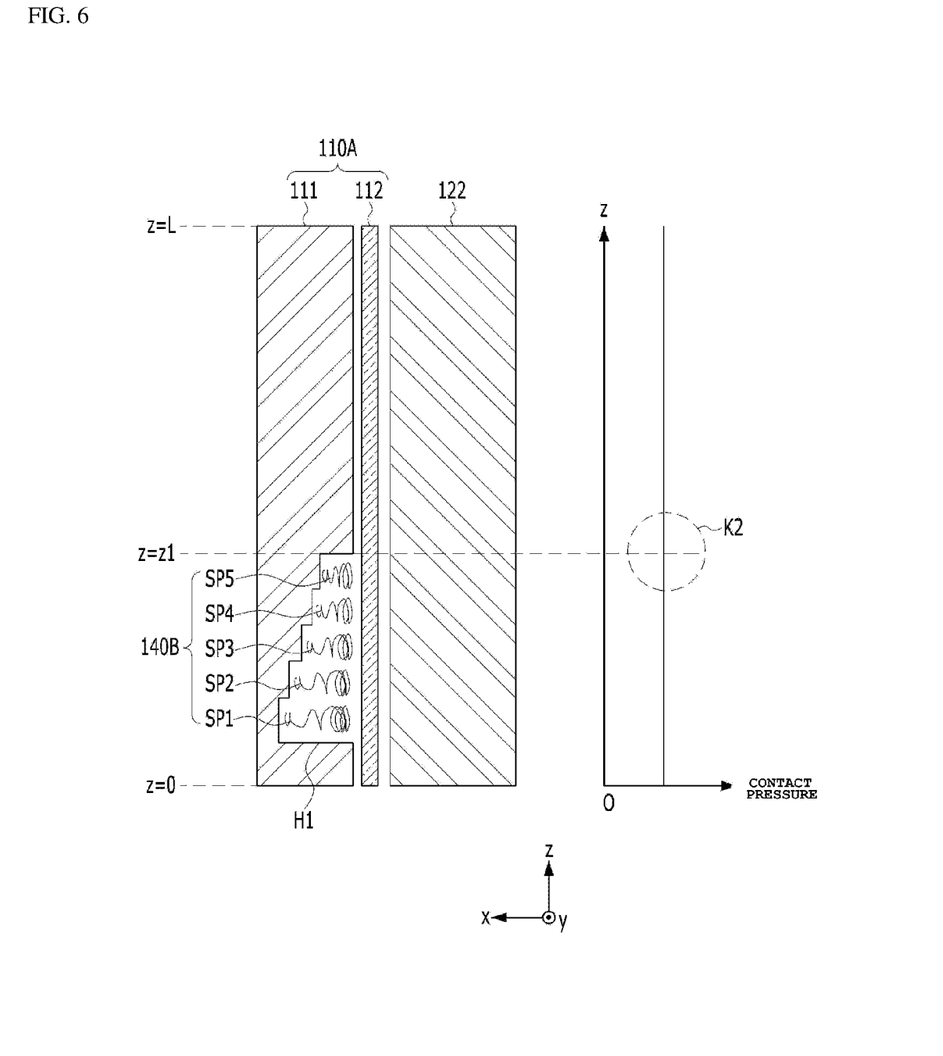
FIG. 6 is a cross-sectional view for explaining another embodiment of the elastic member illustrated in FIG. 4 according to an exemplary embodiment of the present disclosure.
Figure 7:
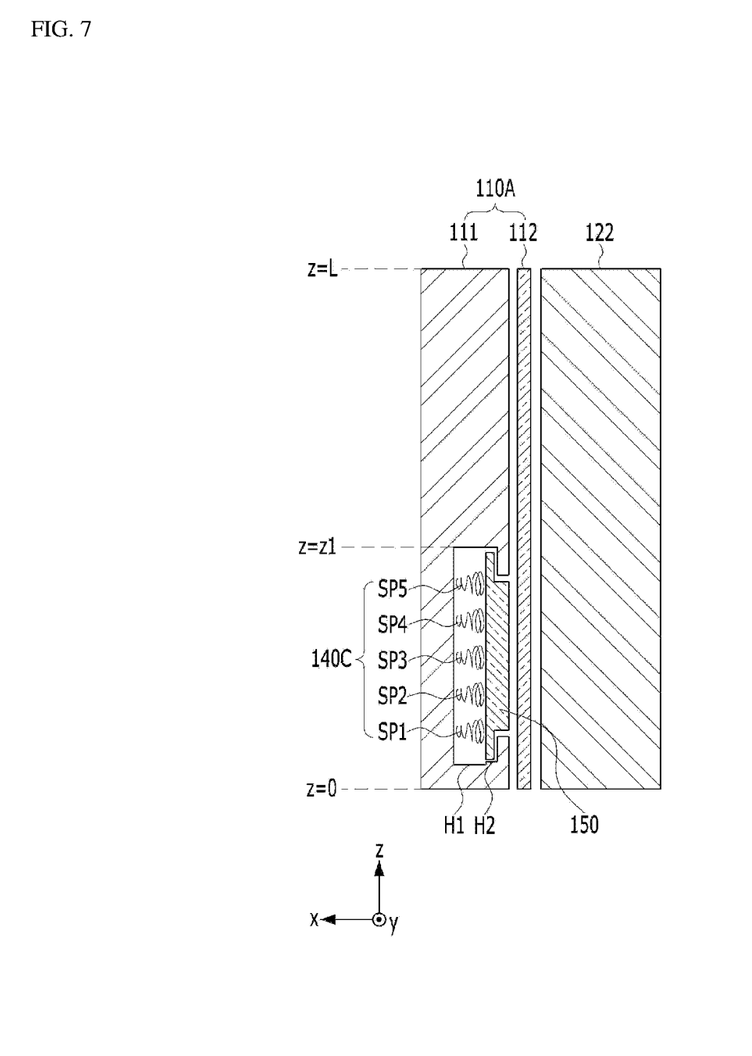
FIG. 7 is a cross-sectional view illustrating a further embodiment of the elastic member illustrated in FIG. 4 according to an exemplary embodiment of the present disclosure.

In each of FIGS. 5 to 7, the cell stack 122 may be realized as illustrated in FIG. 4, but the exemplary embodiments are not limited to a specific cross-sectional shape of the cell stack 122. In each of FIGS. 5 and 6, the graph illustrates the contact pressure for each position in the gravitational direction (e.g. the z-axis direction). In each of FIGS. 5 to 7, each of the elastic members 140A, 140B and 140C may include a plurality of springs SP1, SP2, SP3, SP4 and SP5, which are stacked in the gravitational direction (e.g. the z-axis direction) and are spaced apart from each other in the body 111 of the first end-plate 110A.

The elastic force, the number, and the position of each of the springs SP1, SP2, SP3, SP4 and SP5 included in each of the elastic members 140A, 140B and 140C illustrated in FIGS. 5 to 7 may be determined in consideration of the following various factors. First, the elastic force, the number, and the position of the springs SP1, SP2, SP3, SP4 and SP5 may be determined so that the first area A1 and the second area A2 of the lateral surface 111A of the body 111 have the same initial pressure in the initial state in which the condensate water W does not expand.

In addition, since the elastic member 140A, 140B or 140C may be disposed only in the first area A1, the elastic force, the number, and the position of the springs SP1, SP2, SP3, SP4 and SP5 may be determined to prevent, for example, a change in contact pressure at the boundary of the first area A1 and the second area A2. Hereinafter, examples of the elastic force, the number, and the position of the springs SP1, SP2, SP3, SP4 and SP5 may be determined.

In FIGS. 5 to 7, the number of springs included in each of the elastic members 140A, 140B and 140C is illustrated as being five, but this is merely given by way of example, and the exemplary embodiments are not limited to a specific number of springs included in each of the elastic members 140A, 140B and 140C. In FIGS. 5 to 7, the first area A1 in which the elastic member 140A, 140B or 140C is disposed is an area from the bottom surface 111B of the body 111 (i.e. z=0) to the first point (z=z1) since the condensate water may remain from z=0 to the first point (z=1) in each unit cell 122-n.

In addition, the elastic force of the springs SP1, SP2, SP3, SP4 and SP5 may be reduced with increasing distance from the bottom surface 111B of the body 111. In other words, among the springs SP1, SP2, SP3, SP4 and SP5, the first spring SP1, which is closest to the bottom surface 111B, may have the greatest elastic force, and the fifth spring SP5, which is farthest from the bottom surface 111B, may have the smallest elastic force. In particular, the elastic force of the first spring SP1 to the fifth spring SP5 may be represented by the following Equation 1.

$$F5<F4<F3<F2<F1 \qquad \text{Equation 1}$$

wherein, F1, F2, F3, F4 and F5 respectively represent the elastic force of the first, second, third, fourth, and fifth springs SP1, SP2, SP3, SP4 and SP5.

As described above, the reason why the elastic force of the springs SP1, SP2, SP3, SP4 and SP5 is increased with decreasing distance to the bottom surface 111B is because, in each unit cell 122-n included in the cell stack 122, a greater amount of the condensate water W may remain closer to the bottom of the unit cell 122-n.

In addition, assuming that all of the springs SP1, SP2, SP3, SP4 and SP5 have the same elastic force per unit length, as illustrated in FIG. 6, the springs SP1, SP2, SP3, SP4 and SP5 may be shorter with increasing distance from the bottom surface 111B in the gravitational direction (e.g. in the x-axis direction). When the springs SP1, SP2, SP3, SP4 and SP5 have the same elastic force per unit length and have the same length, as illustrated in FIG. 5, a change in contact pressure K1 may locally occur at the boundary point (z=z1) of the first area A1 and the second area A2.

However, as illustrated in FIG. 6, when the springs SP1, SP2, SP3, SP4 and SP5 have the same elastic force per unit length and are shorter with increasing distance from the bottom surface 111B, no change may be detected in contact pressure K2 at the boundary point (z=z1) of the first area A1 and the second area A2.

Furthermore, as illustrated in FIG. 7, the fuel cell 100A may further include a stopper 150 disposed between the collector plate 112 and the elastic member 140A. Accordingly, the body 111 may further have a second recess H2, which is disposed between the first recess H1 and the collector plate 112 and accommodates the stopper 150 therein. The stopper 150 may prevent the elastic member 140C from protruding from the body 111 to the collector plate 112 when the fastening force of the fuel cell 100 or 100A is deteriorated later. In addition, the stopper 150 may be disposed to overlap the gaskets 232 and 234 in the first direction (e.g. in the x-axis direction), but the exemplary embodiments are not limited to a specific position of the stopper 150.

Hereinafter, a fuel cell according to a comparative example and a fuel cell according to the embodiment will be compared with each other and described. It may be assumed that the fuel cell according to the comparative example has the same configuration as the fuel cell according to the exemplary embodiment except that it does not include the elastic member 140; 140A, 140B or 140C. In the respective fuel cells according to the comparative example and the exemplary embodiment, as the byproduct of power generation using hydrogen and oxygen, the condensate water may be generated inside each of the unit cells 122-1 to 122-N as described above.

Figure 8:
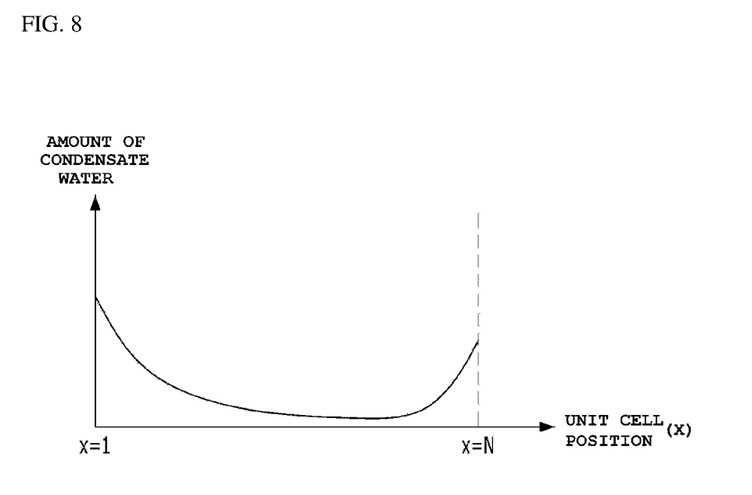
FIG. 8 is a graph illustrating the amount of condensate water for each unit cell according to an exemplary embodiment of the present disclosure.

FIG. 8 is a graph illustrating the amount of condensate water W for each unit cell 122-*n*, in which the horizontal axis represents the position of the unit cells, and the vertical axis represents the amount of condensate water. As illustrated in FIG. 8, a greater amount of condensate water W remains in the unit cell which is located closer to each of the first and second end-plates 110A and 110B, rather than being removed from the lower end of the unit cell. In other words, the amount of condensate water W, which remains in the first unit cell located closest to the first end-plate 110A (at a point at which x is 1) and the amount of condensate water W, which remains in the $N^{th}$ unit cell located closest to the second end-plate 110B (at a point at which x is N) are greater than the amount of condensate water which remains in the other unit cells.

Figure 9A:
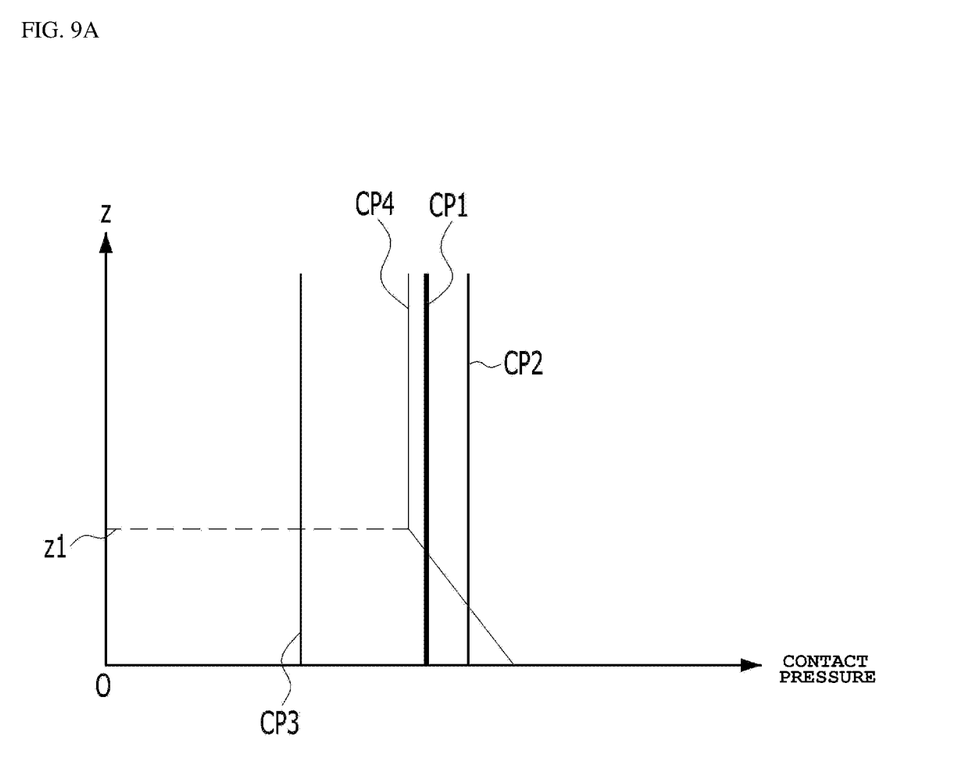
FIGS. 9A and 9B are graphs illustrating the profile of contact pressure on the reaction surface of a unit cell according to a comparative example and the exemplary embodiment under various conditions.
Figure 9B:
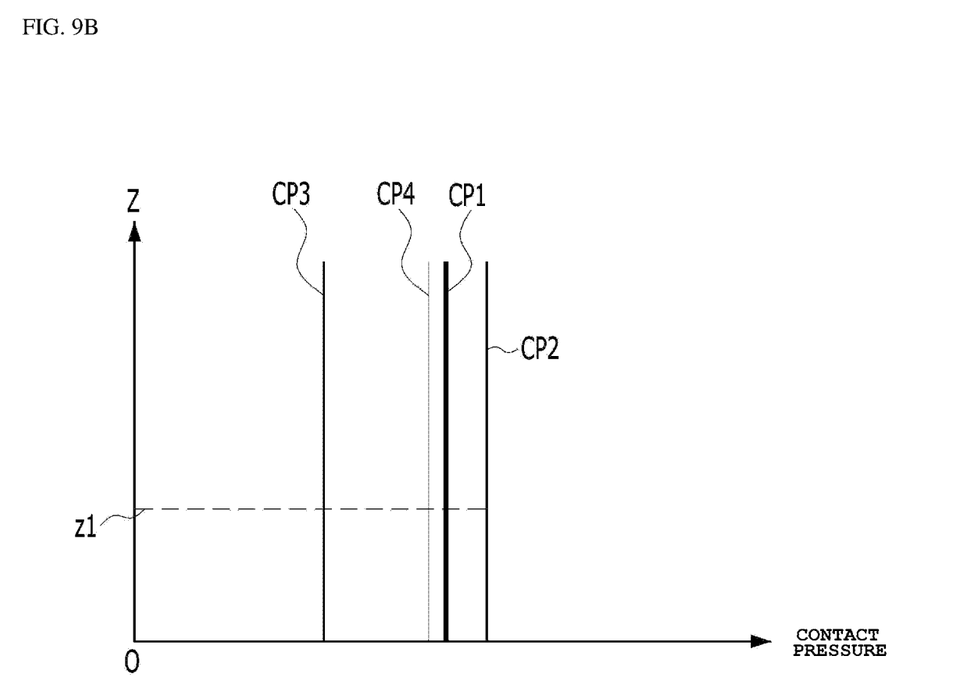

FIGS. 9A and 9B are graphs illustrating the profile of contact pressure on the reaction surface of the unit cell 122-*n* according to the comparative example and the exemplary embodiment under various conditions, respectively. In each graph, the vertical axis represents the position in the gravitational direction in each unit cell 122-*n*, and the horizontal axis represents the contact pressure. When the vehicle including the fuel cell 100 is exposed to a low temperature for a long period of time, the condensate water W remaining inside each unit cell 122-*n* of the cell stack 122 freezes, and thus, the contact pressure in a specific area of the unit cells may be increased due to the expansion force of the condensate water.

In the fuel cells according to the comparative example illustrated in FIG. 9A and the exemplary embodiment illustrated in FIG. 9B, the contact pressure CP1 at the initial time (hereinafter 't1') at which the cell stack 122 is fastened may be about 1 Mpa, and the contact pressure CP2 at operation time (hereinafter 't2') at which the cell stack 122 operates becomes greater than the initial contact pressure CP1. The contact pressure CP3 at time (hereinafter 't3') after an increase in the durability of the cell stack 122 in each fuel cell may be reduced less than the initial contact pressure CP1. Particularly, t3 refers to a time after the cell stack 122 operates during a constant period (e.g. about 5,000 hours) and t2 refers to a time between t1 and t3. In other words, the temperature of the cell stack 122 is a room temperature at the time t1, while the temperature of the cell stack 12 may be a high temperature greater than the room temperature after the time t1 and before the time t3. Thus, t3 corresponds to a time after the room temperature and the high temperature are repeated.

As illustrated in FIG. 9A, for the fuel cell according to the comparative example, the contact pressure CP4 increases in the lower area of the unit cell 122-*n* when the condensate water W freezes. When the contact pressure CP4 increases, irreversible plastic deformation may occur in the gas diffusion layers 222 and 224 and the separation plates 242 and 244 among the inner constituent elements of the unit cell 122-*n*. Thereby, the performance and durability of the cell stack 122 may deteriorate.

On the other hand, for the fuel cell 100 or 100A according to the exemplary embodiment, the elastic member 140; 140A, 140B or 140C may be disposed in a portion of the first area A1 of the end-plate 110A or 110B to overlap the lower area of each unit cell 122-*n* in the first direction (e.g. x-axis direction), thereby offsetting an increase in contact pressure on the reaction surface. Accordingly, as illustrated in FIG. 9B, in the fuel cell 100 or 100A according to the exemplary embodiment, the contact pressure CP4 on the reaction surface may be maintained at a constant value when the condensate water W freezes.

In addition, when the condensate water W freezes and expands in volume, stress may be concentrated on the lower area of the unit cell 122-*n*. In particular, the stress may be concentrated on the lower area of the first unit cell 122-1. In this situation, when the stress is not offset, the condensate water W may expand in the direction indicated by the arrow in FIG. 4 and thus, the microporous structure (e.g. 244-1, 244-2 or 244-3) may penetrate into the second gas diffusion layer (e.g. 224-1, 224-2 or 224-3), and the first channel P1 of the first separation plate (e.g. 242-1, 242-2 or 242-3) may penetrate into the first gas diffusion layer (e.g. 222-1, 222-2 or 222-3).

The microporous structure (e.g. 244-1, 244-2 or 244-3) may repeatedly penetrate into the second gas diffusion layer (e.g. 224-1, 224-2 or 224-3) and may cause damage to the membrane. In addition, when the channel P1 of the first separation plate (e.g. 242-1, 242-2 or 242-3) repeatedly penetrates into the first gas diffusion layer (e.g. 222-1, 222-2 or 222-3), the cross-sectional area of the channel P1 in which hydrogen may flow may be reduced in the lower area of the first separation plate 242-*n* of each unit cell 122-*n*. Thus, there may occur an area in which a reaction is deteriorated due to congestion of the condensate water W, which may cause deterioration of a catalyst.

Through the provision of the elastic member 140: 140A, 140B or 140C, the fuel cell 100 or 100A according to the exemplary embodiment may prevent damage to the gas diffusion layers 222 and 224 and the separation plates 242 and 244, may prevent a reduction in the cross-sectional area of the channel P1, and may prevent damage to the membrane. Accordingly, the performance and durability of the cell stack 122 of the fuel cell 100 or 100A may be improved.

In addition, by providing the elastic member 140: 140A, 140B or 140C in the end-plate 110A or 110B, the fuel cell 100 or 100A according to the exemplary embodiment may have no negative effect on the functions, i.e. airtightness, watertightness, insulation, and rigidity of other constituent elements of the fuel cell 100 or 100A. For example, since the elastic member 140: 140A, 140B or 140C may be locally disposed in the first area A1 of the end-plate 110A or 110B, it may be possible to minimize deterioration in the rigidity of the end-plate 110A or 110B and to minimize an increase in the weight of the fuel cell 100.

As is apparent from the above description, a fuel cell according to exemplary embodiments may prevent damage to a gas diffusion layer and a separation plate using an elastic member, may prevent a reduction in the cross-sectional area of a channel, and may prevent damage to a membrane, whereby the fuel cell may achieve enhanced performance and durability. Moreover, since the elastic member may be disposed in a local area inside an end-plate, it may be possible to minimize deterioration in the rigidity of the end-plate and to minimize an increase in the weight of the fuel cell without having a negative effect on the airtightness, watertightness, insulation, or rigidity of other constituent elements of the fuel cell.

The above-described exemplary embodiments may be combined with each other unless they are not conflict with each other without departing from the object of the disclosure. In addition, when constituent elements of any exemplary embodiment among the above-described various exemplary embodiments are not described in detail, a description related to the constituent elements having the same reference numerals of other exemplary embodiments may be adopted.

Although exemplary embodiments have been described above, the above description is merely given by way of example and is not intended to limit the disclosure, and it will be apparent to those skilled in the art that various substitutions, modifications, and alterations may be devised within the spirit and scope of the exemplary embodiments. For example, the respective constituent elements described in the exemplary embodiments may be modified in various ways. In addition, differences associated with these modifications and alterations should be interpreted as being included in the scope of the disclosure defined by the accompanying claims.

What is claimed is:

1. A fuel cell, comprising:
   a cell stack in which a plurality of unit cells are stacked in a first direction;
   an end-plate disposed on each of opposite side ends of the cell stack; and
   an elastic member overlapped with an area of the cell stack in which condensate water remains in the first direction, at least a portion of the elastic member being disposed in the end-plate,
   wherein the end-plate includes:
   a body having a bottom surface, a top surface opposite to the bottom surface in a second direction which is a direction perpendicular to the first direction, and an inner lateral surface connecting the bottom surface and the top surface and facing the cell stack;
   wherein a single recess is disposed in the inner lateral surface and the single recess is offset from a center of the inner lateral surface such that the single recess is disposed at a position which is closer to the bottom surface of the body than the top surface of the body; and
   wherein the elastic member is disposed in the single recess.

2. The fuel cell according to claim 1, wherein the end-plate further includes a collector plate disposed between the cell stack and the inner lateral surface of the body that faces the stack,
   wherein the elastic member is spaced apart from the collector plate.

3. The fuel cell according to claim 2, wherein the elastic member has the same repulsive force as a pressure applied to the inner lateral surface of the body by expansion force of the condensate water.

4. The fuel cell according to claim 3, wherein the repulsive force of the elastic member ranges from about 0.8 Mpa to 1.2 Mpa.

5. The fuel cell according to claim 3, wherein the elastic member has an elastic modulus that causes the repulsive force to be less than about 1.5 Mpa when a displacement of the inner lateral surface by the expansion force is about 1 mm.

6. The fuel cell according to claim 2, wherein each of the unit cells includes:
   a membrane electrode assembly including a fuel electrode, an air electrode, and a polymer electrolyte membrane disposed between the fuel electrode and the air electrode;
   a gas diffusion layer disposed on either side of the membrane electrode assembly; and
   a separation plate disposed at an outer side of the gas diffusion layers.

7. The fuel cell according to claim 6, further comprising:
   a stopper disposed between the collector plate and the elastic member.

8. The fuel cell according to claim 7, wherein each of the unit cells further includes a gasket disposed between the separation plate and the gas diffusion layer, and wherein the stopper is disposed to overlap the gasket in the first direction.

9. The fuel cell according to claim 6, wherein the inner lateral surface is formed of a first area having the single recess disposed therein and a second area which is closer to the top surface of the body, and a first length of the first area in the second direction corresponds to a length from a bottom surface of the separation plate to a first point that is one third of an overall height of the separation plate, and a second length of the second area in the second direction corresponds to a length from the first point to a top surface of the separation plate.

10. The fuel cell according to claim 1, wherein the inner lateral surface is formed of a first area having the single recess disposed therein and a second area which is closer to the top surface of the body, and the first area has a first length that is equal to or less than a second length of the second area in the second direction.

11. The fuel cell according to claim 10, wherein the first length corresponds to a length from the bottom surface of the body to a first point that is one third of an overall height of the body, and wherein the second length corresponds to a length from the first point to the top surface of the body.

12. The fuel cell according to claim 1, wherein the elastic member includes a plurality of springs stacked in the second direction and spaced apart from each other.

13. The fuel cell according to claim 12, wherein the inner lateral surface is formed of a first area having the single recess disposed therein and a second area which is closer to the top surface of the body, and the respective springs has elastic force to cause the first area and the second area to have the same initial pressure in an initial state in which the condensate water does not expand.

14. The fuel cell according to claim 12, wherein the respective springs are reduced in elastic force with increasing distance from a bottom surface of the body.

15. The fuel cell according to claim 12, wherein the springs have the same elastic force per unit length, and wherein the further the respective springs are disposed from the bottom surface of the body, the shorter length the respective springs have.

16. The fuel cell according to claim 1, wherein the elastic member includes:
   a first elastic member disposed inside the end-plate disposed on a first side end among the opposite side ends of the cell stack; and
   a second elastic member disposed inside the end-plate disposed on a second side end among the opposite side ends of the cell stack.

17. The fuel cell according to claim 16, wherein an elastic force of the first elastic member is different from an elastic force of the second elastic member.

18. The fuel cell according to claim 17, wherein a reactant gas is introduced or discharged via the first side among the opposite side ends of the cell stack, and the elastic force of the first elastic member is greater than the elastic forced of the second elastic member.

19. The fuel cell according to claim 16, wherein the first elastic member and the second elastic member have a symmetrical cross-sectional shape in the first direction with respect to the center of the cell stack.

* * * * *